(12) United States Patent
Wu et al.

(10) Patent No.: US 9,100,953 B2
(45) Date of Patent: Aug. 4, 2015

(54) SYSTEM AND METHOD FOR SEMI-PERSISTENT RESOURCE SCHEDULING

(75) Inventors: Wei Wu, Coppell, TX (US); Zhijun Cai, Euless, TX (US); James Earl Womack, Bedford, TX (US); Takashi Suzuki, Ichikawa (JP); Sean Bartholomew Simmons, Waterloo (CA); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 137 days.

(21) Appl. No.: 13/618,077

(22) Filed: Sep. 14, 2012

(65) Prior Publication Data

US 2013/0010730 A1    Jan. 10, 2013

Related U.S. Application Data

(63) Continuation of application No. 12/333,682, filed on Dec. 12, 2008, now Pat. No. 8,295,233.

(60) Provisional application No. 61/013,711, filed on Dec. 14, 2007.

(51) Int. Cl.
*H04W 4/00* (2009.01)
*H04W 72/04* (2009.01)

(52) U.S. Cl.
CPC .................................. *H04W 72/042* (2013.01)

(58) Field of Classification Search
CPC . H04W 72/04; H04W 72/042; H04W 72/044; H04W 72/0406; H04W 76/06; H04W 76/066; H04M 1/2535; H04L 1/1812; H04L 1/1822
USPC .......... 370/310–350, 431–463; 455/450–455
See application file for complete search history.

(56) References Cited

U.S. PATENT DOCUMENTS

| 7,899,003 | B2 | 3/2011 | Xu | |
|---|---|---|---|---|
| 2005/0174956 | A1 | 8/2005 | Yi et al. | |
| 2006/0039319 | A1 | 2/2006 | Lee et al. | |
| 2007/0091873 | A1* | 4/2007 | LeBlanc et al. | 370/352 |
| 2008/0084851 | A1* | 4/2008 | Kim et al. | 370/336 |
| 2008/0117891 | A1 | 5/2008 | Damnjanovic et al. | |
| 2009/0073958 | A1 | 3/2009 | Xu | |
| 2009/0103500 | A1* | 4/2009 | Malkamaki et al. | 370/336 |
| 2010/0265862 | A1 | 10/2010 | Choi et al. | |
| 2011/0010598 | A1* | 1/2011 | Wang et al. | 714/748 |
| 2011/0096733 | A1* | 4/2011 | Zhao et al. | 370/329 |

OTHER PUBLICATIONS

U.S. Appl. No. 61/000,261.*

(Continued)

*Primary Examiner* — Ricky Ngo
*Assistant Examiner* — Wei-Po Kao
(74) *Attorney, Agent, or Firm* — Conley Rose, P.C.; J. Robert Brown, Jr.

(57) ABSTRACT

A component in a telecommunications system is provided. The component includes one or more processors configured to promote semi-persistent scheduling of a resource and to send a release message. The release message informing the user equipment to cease attempting to process data from the downlink portion. Also provided is user equipment comprising one or more processors configured to promote providing an indication that a request for an uplink resource is related to a voice over Internet Protocol call.

17 Claims, 7 Drawing Sheets

(56) References Cited

OTHER PUBLICATIONS

U.S. Appl. No. 60/991,765.*
Qualcomm Europe, Semi-Persistent Scheduling, 3GPP TSG-RAN WG2 #60, Nov. 5-9, 2007.*
Canadian Office Action; Application No. 2,709,150; Nov. 22, 2012; 3 pages.
Canadian Office Action; Application No. 2,709,150; Jan. 15, 2014; 4 pages.
Wu, Wei, et al.; U.S. Appl. No. 12/333,682, filed Dec. 12, 2008; Title: System and Method for Resource Scheduling.
3GPP TS 36.300 V8.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2007; 109 pages.
3GPP TSG-RAN WG2 #60; "Semi-Persistent Scheduling"; R2-075166; Jeju, Korea; Nov. 5-9, 2007; 2 pages.
3GPP TSG-RAN-WG2 Meeting #58; "Uplink VoIP Scheduling with Fast Indication"; R2-071961; Kobe, Japan; May 7-11, 2007; 4 pages.
3GPP TSG-RAN WG2 Meeting #57bis; "Uplink Scheduling for VoIP"; R2-071460; St. Julian's, Malta; Mar. 26-30, 2007; 14 pages.
3GPP TSG-RAN WG2 Meeting #57; "Uplink Scheduling for VoIP"; R2-070476; St. Louis, Missouri; Feb. 12-16, 2007; 16 pages.
3GPP TSG-RAN WG2 Meeting #56; "Draft2 Minutes of the 55th TSG-RAN WG2 Meeting"; R2-063339; Riga, Latvia; Nov. 6-10, 2006; 56 pages.
3GPP TSG RAN WG1 Meeting #48bis; "DL Control Signaling and Multiplexing for VoIP"; R1-071721; St. Julians, Malta; Mar. 26-30, 2007; 4 pages.
Jiang, Dajie, et al.; "Principle and Performance of Semi-persistent Scheduling for VoIP in LTE System"; IEEE; Sep. 21, 2007; 4 pages.
Office Action dated Mar. 21, 2011; U.S. Appl. No. 12/333,682, filed Dec. 12, 2008; 24 pages.
Final Office Action dated Sep. 16, 2011; U.S. Appl. No. 12/333,682, filed Dec. 12, 2008; 21 pages.
Advisory Action dated Dec. 1, 2011; U.S. Appl. No. 12/333,682, filed Dec. 12, 2008; 3 pages.
Office Action dated Mar. 2, 2012; U.S. Appl. No. 12/333,682, filed Dec. 12, 2008; 12 pages.
Notice of Allowance dated Jul. 19, 2012; U.S. Appl. No. 12/333,682, filed Dec. 12, 2008; 9 pages.
PCT Invitation to Pay Additional Fees; Application No. PCT/US2008/086573; Apr. 15, 2009; 8 pages.
PCT International Search Report; Application No. PCT/US2008/086573; Jul. 10, 2009; 6 pages.
PCT Written Opinion of the International Searching Authority; PCT Application No. PCT/US2008/086573; Jul. 10, 2009; 9 pages.
PCT International Preliminary Report on Patentability; PCT Application No. PCT/US2008/086573; Mar. 18, 2010; 14 pages.
European Examination Report; Application No. 08861094.4; Dec. 10, 2010; 3 pages.
European Examination Report; Application No. 08861094.4; May 16, 2011; 6 pages.
European Intent to Grant; Application No. 08861094.4; Apr. 16, 2012; 8 pages.
European Extended Search Report; Application No. 11160673.7; Jun. 1, 2011; 9 pages.
European Examination Report; Application No. 11160673.7; Mar. 8, 2013; 6 pages.
Canadian Office Action; Application No. 2,709,150; Oct. 23, 2014; 4 pages.

* cited by examiner

SYSTEM AND METHOD FOR SEMI-PERSISTENT RESOURCE SCHEDULING

CROSS-REFERENCE TO RELATED APPLICATIONS

This application is a continuation of U.S. patent application Ser. No. 12/333,682 filed Dec. 12, 2008, by Wei Wu, et al. entitled "System and Method for Resource Scheduling", which claims priority to U.S. Provisional Patent No. 61/013,711, filed Dec. 14, 2007, by Wei Wu, et al. entitled "Resource Scheduling for Long Term Evolution Voice Over Internet Protocol", which are incorporated by reference herein as if reproduced in their entirety.

BACKGROUND

Easily transportable devices with wireless telecommunications capabilities, such as mobile telephones, personal digital assistants, handheld computers, and similar devices, will be referred to herein as user equipment (UE). The term "user equipment" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A UE might communicate with a second UE, some other element in a telecommunications network, an automated computing device such as a server computer, or some other device, any of which can be referred to as another system. A communications connection between a UE and other systems might promote a voice call, a file transfer, or some other type of data exchange, any of which can be referred to as a call or a session.

As telecommunications technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched based telephone communication over the Internet. The term "VoIP" will refer herein to any packet switched call connected via the Internet, regardless of the specific technology that might be used to make the call.

For a wireless VoIP call, the signal that carries data between a UE and an ENB can have a specific set of frequency and time parameters and other characteristics that might be specified by the ENB. A connection between a UE and an ENB that has a specific set of such characteristics can be referred to as a resource. An ENB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
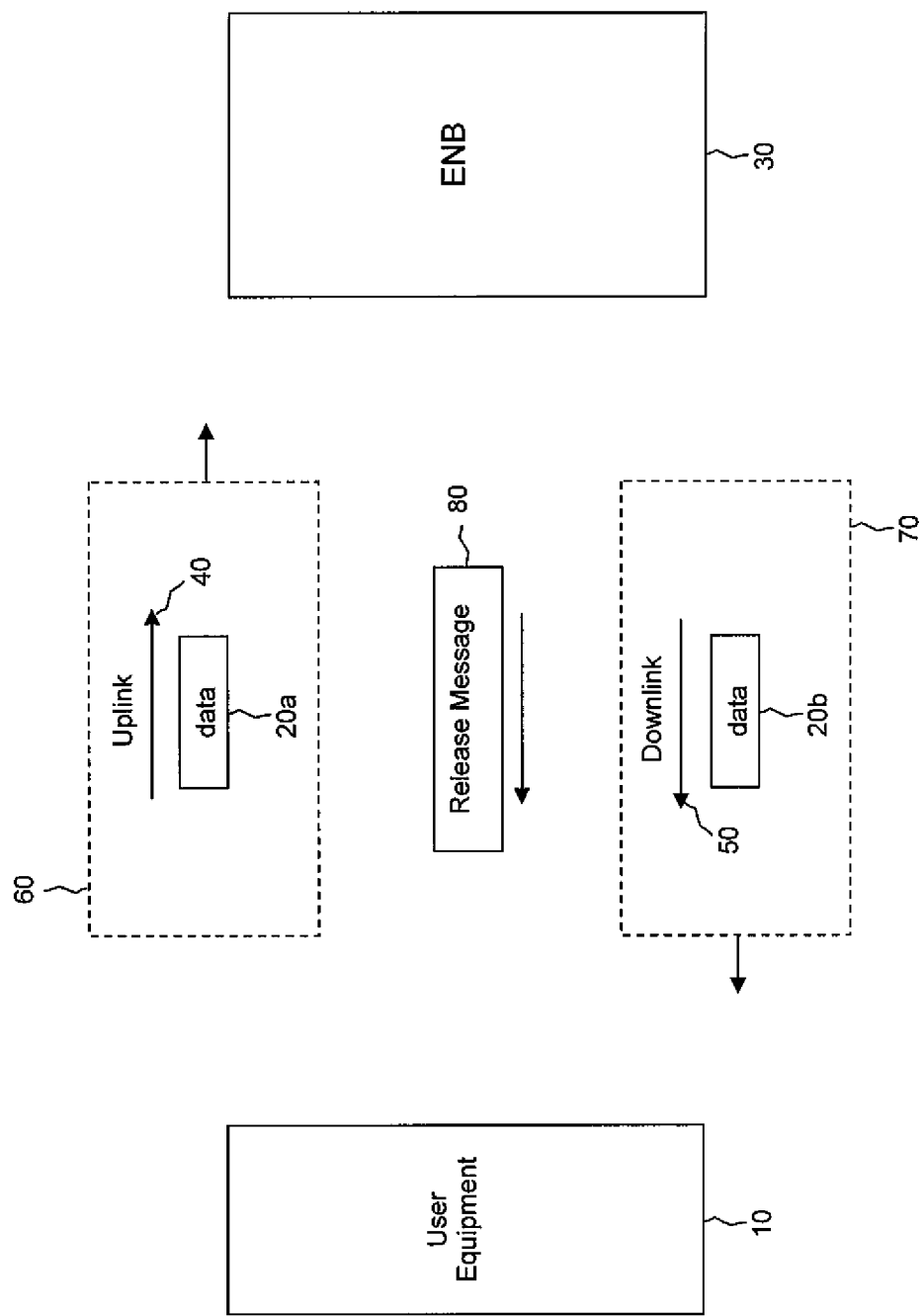
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a component in a telecommunications system is provided. The component includes one or more processors configured to promote sending a release message to a user equipment when a silent period occurs in a downlink portion of a voice over Internet Protocol call to the user equipment. The release message informs the user equipment to cease attempting to process data from the downlink portion.

In another embodiment, user equipment is provided. The user equipment includes one or more processors configured to discontinue attempting to process data on a downlink resource upon receiving a message indicating that the downlink resource has been released. The release is due to an occurrence of a silent period on the downlink resource.

In another embodiment, a method for managing a resource for a voice over Internet Protocol call is provided. The method includes sending a release message to a user equipment when a silent period occurs in a downlink portion of the call, and the user equipment, upon receiving the release message, ceasing to attempt to process data from the downlink portion.

In another embodiment, a component in a telecommunications system is provided. The component includes one or more processors configured to receive a notification of a silent period in an uplink portion of a voice over Internet Protocol call and, when a traffic level in the telecommunications system is below a threshold, to retain an existing resource with a user equipment during the silent period.

In another embodiment, a method is provided for managing a resource for a voice over Internet Protocol call. The method includes when a quantity of available resources in a telecommunications system is above a threshold, retaining an existing resource for an uplink data transmission when a silent period occurs in the uplink data transmission.

In another embodiment, a component in a telecommunications system is provided. The component includes one or more processors configured to assign an appropriate level of resource capacity to a user equipment for an uplink from the user equipment to the component upon receiving from the user equipment an indication that the uplink will carry a voice over Internet Protocol call.

In another embodiment, a user equipment is provided that includes one or more processors configured to promote providing an indication that a request for an uplink resource is related to a voice over Internet Protocol call.

In another embodiment, a method for establishing an uplink resource for a voice over Internet Protocol call is provided. The method includes indicating that a request for the uplink resource is related to the voice over Internet Protocol call, and assigning to the uplink resource a capacity appropriate for the voice over Internet Protocol call.

There can be periods of silence in a VoIP call during which no voice-based data packets are transmitted between a UE and an ENB. For example, if a first party in a call pauses in the course of a conversation, a silent period might occur in the uplink from that party's UE to the ENB until that party resumes talking. Similarly, a silent period might occur in the downlink from the ENB to the UE of the second party in the conversation until the first party resumes talking.

To promote efficient transmission of wireless VoIP calls, an ENB might cease data transmission on a first resource for a first call when a silent period occurs in that call. The ENB might then allow a second call to make use of the first resource. When the silent period in the first call ends, the ENB might resume the first call on a second resource. In this way, resources are not wasted in transmitting data packets that contain only silence and no voice-based data. The amount of time that resources remain idle can be reduced. When release and reallocation of resources in this manner is allowed, a call can be said to follow semi-persistent scheduling. If a single resource is allocated to a call throughout the duration of the call, the call can be said to follow persistent scheduling.

While semi-persistent scheduling can increase the efficiency of wireless VoIP calls, several undesirable situations can arise under such scheduling. In a downlink transmission under semi-persistent scheduling, an ENB is typically aware of when silent periods occur in the data that it sends to the UEs under its control. When the ENB sees that a silent period occurs in a data transmission to a UE on a particular resource, the ENB can reallocate that resource to a different UE. However, if the UE is not aware that the resource has been reallocated, the UE might continue to attempt to receive and process data via that resource. Such attempts to receive and process data on a resource that has been reallocated elsewhere can waste the UE's battery power and processing capacity and cause other increases in overhead expenditure. In addition, the UE might send error messages to the ENB informing the ENB that the UE is not receiving data on the resource that the UE had been using. Since the ENB is already aware that that resource has been reallocated to another UE, such messages are unnecessary and can cause a further increase in overhead.

In an uplink transmission under semi-persistent scheduling, a UE typically informs the ENB with which it is communicating when a silent period occurs for the UE. Upon receiving this information from the UE, the ENB can reallocate the resource that was being used by the UE to another UE to optimize data transmission efficiency in the overall system of the ENB and the UEs. Under conditions of heavy traffic between an ENB and the UEs under its control, the increase in efficiency can compensate for the effort needed to perform the reallocation. However, under light load conditions between the ENB and the UEs, the overhead consumed in the act of resource reallocation can outweigh any efficiency increases that might be gained through the reallocation. That is, if sufficient resources are available, resource reallocation may be unnecessary and inefficient.

In various embodiments, modifications can be made to uplink and downlink transmissions between an ENB and the UEs under its control to prevent these undesirable situations. For a downlink transmission, an ENB might send a UE an explicit message informing the UE that the resource via which the UE had been communicating has been released. The UE will then be aware that it should no longer attempt to receive and process data via that resource. For an uplink transmission, an ENB might perform resource reallocation only when the traffic volume between the ENB and the UEs under its control exceeds a threshold. That is, when traffic is low and large quantities of resources are available, there may be no need to perform resource reallocation, and a UE might be allowed to retain its uplink resource when the UE enters a silent period.

FIG. 1 illustrates a situation in which such downlink and uplink management might occur. A UE 10 is sending data 20a to an ENB 30 via an uplink 40 and receiving data 20b from the ENB 30 via a downlink 50. The uplink 40 is established via an uplink resource 60, and the downlink 50 is established via a downlink resource 70. In other embodiments, a traditional base station or a similar component might be used instead of the ENB 30. Hereinafter, any such component will be referred to as the ENB 30.

Management of the downlink 50 will be considered first. In an embodiment, when a silent period occurs in the downlink 50, the ENB 30 can send an explicit release message 80 to the UE 10 informing the UE 10 that the downlink resource 70 that the UE 10 had been using to receive the data 20b has been released. Upon receiving the release message 80, the UE 10 stops attempting to receive and process data packets on the downlink resource 70.

Two benefits might be derived from the use of the release message 80. First, the UE 10 can stop monitoring the downlink resource 70 when it receives the release message 80. This can prevent the waste of overhead that the UE 10 might consume in attempting to receive and process data packets on the downlink resource 70 after the downlink resource 70 has been released from the UE 10 and assigned to another UE. Second, there would be no need for the UE 10 to send error messages that it might otherwise send upon attempting to receive and process data packets on a resource that has been released, which may further prevent wasting overhead.

It is well known in the art that a data frame known as a silence insertion descriptor (SID) can be sent from the ENB 30 to the UE 10 when a silent period occurs on a downlink 50. The UE 10 can interpret an SID as an indication that a silent period is about to occur on the downlink 50 and can stop monitoring its current downlink resource 70 upon receiving an SID. However, SIDs may only be transmitted at intervals of several hundred milliseconds. When a downlink silent period begins, several hundred milliseconds could elapse before the UE 10 receives an SID and learns that it can stop monitoring its downlink resource 70. During this time between the beginning of the downlink silent period and the receipt of an SID, waste of overhead could occur as described above as the UE 10 attempts to monitor a resource that has been released.

By contrast, the release message 80 is sent from the ENB 30 to the UE 10 near the beginning of a silent period in the downlink data 20b. The UE 10 can promptly stop monitoring the downlink resource 70 upon receiving the release message 80. This can prevent a waste of overhead that might occur if the UE 10 waited until receiving an SID to stop monitoring. Also, the release message 80 contains an explicit instruction for the UE 10 to stop monitoring its downlink resource 70, while an SID typically must be interpreted appropriately by the UE 10 in order for the UE 10 to stop monitoring.

In some embodiments, the release message 80 can be sent in the media access control (MAC) signaling from the ENB 30 to the UE 10. In other embodiments, the release message 80 can be sent in the radio resource control (RRC) signaling from the ENB 30 to the UE 10. In other embodiments, the release message 80 can be sent in other layers.

Figure 2:
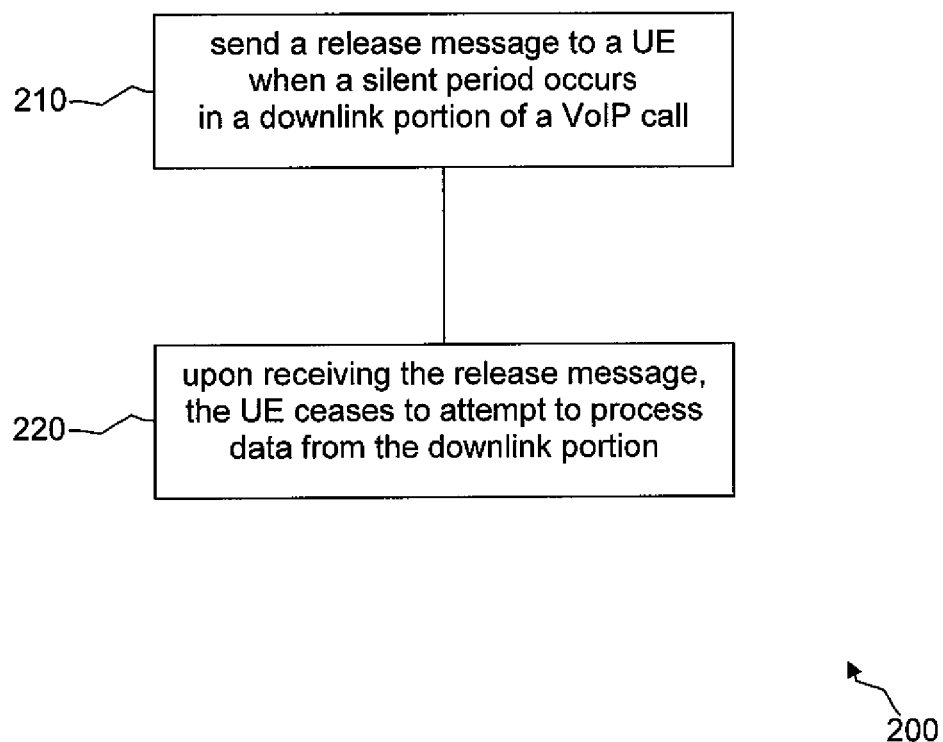
FIG. 2 is a diagram of a method for managing a resource for the downlink portion of a voice over Internet Protocol call according to an embodiment of the disclosure.

FIG. 2 illustrates an embodiment of such a method 200 for managing a resource for a VoIP call. At block 210, when a silent period occurs in a downlink portion of a VoIP call, a release message is sent to a UE engaged in the call. At block 220, upon receiving the release message, the UE ceases to attempt to process data from the downlink portion.

Referring back to FIG. 1, Management of the uplink 40 will now be considered. When a silent period occurs in the uplink data 20a sent from the UE 10 to the ENB 30, the UE 10 typically informs the ENB 30 of the existence of the silent period. More specifically, the UE 10 can send the ENB 30 a buffer status report informing the ENB 30 that the UE 10 is not sending any voice-based data on the uplink 40. When an uplink silent period occurred under traditional semi-periodic scheduling, the ENB 30 would promptly release the uplink resource 60 being used by the UE 10. That is, the ENB 30 would make the uplink resource 60 available to other UEs and would inform the UE 10 that the uplink resource 60 is no longer available to the UE 10.

In an embodiment, the uplink resource 60 is not necessarily released when a silent period occurs in the uplink data 20a. The ENB 30, a component within or a component in communication with the ENB 30, can monitor the quantity of resources available at a given time. When the quantity of available resources is below a threshold, such as when there are fewer available signaling resources, at a time when a silent period occurs in the uplink data 20a, the ENB 30 releases the uplink resource 60 as was done traditionally. However, when the quantity of available resources is above the threshold, such as when there are more available signaling resources, at a time when a silent period occurs in the uplink data 20a, the ENB 30 does not release the uplink resource 60. Instead, the UE 10 retains use of the uplink resource 60, and the uplink resource 60 is available for use by the UE 10 when the UE 10 is ready to resume sending voice-based data packets.

Releasing the uplink resource 60 only when there is a lack of resources for other UEs can reduce the overhead expenditures that might occur when the UE 10 is ready to resume sending voice-based data packets to the ENB 30. Previously, when an uplink silent period ended, the UE 10 would send the ENB 30 a request for a new uplink resource to replace the uplink resource that was released. Additional signaling between the ENB 30 and the UE 10 might then have occurred to establish the new resource. The retention of the uplink resource 60 when sufficient other resources are available for other UEs can eliminate the need for this signaling between the ENB 30 and the UE 10. This can not only save battery power that the UE 10 might spend in performing the signaling, it can also reduce delays that might occur while the signaling takes place.

When few resources are available and the uplink resource 60 is released, the ENB 30 may send the UE 10 a message informing the UE 10 that the uplink resource 60 has been released, as was done previously. The UE 10 then knows to request a new resource when it is ready to resume sending voice-based data packets. When large quantities of resources are available and the UE 10 is allowed to retain its uplink resource 60, in an embodiment, the ENB 30 does not send such a message. When the UE 10 does not receive such as message, the UE 10 assumes that the uplink resource 60 is still available and continues to use the uplink resource 60 when it is ready to resume sending voice-based data packets to the ENB 30.

The resource availability threshold that determines whether the uplink resource 60 is released or retained when an uplink silent period begins. The resource availability threshold may be set at any level desired by the entity, such as by a network operator or system that manages the ENB 30 or some other entity. The resource availability threshold can be viewed as a quantity of available resources, in which case a quantity below the resource availability threshold can trigger release of the uplink resource 60 and a quantity above the resource availability threshold can trigger the retention of the uplink resource 60 by the UE 10. Alternatively, the resource availability threshold can be viewed as a lack of available resources or as a level of traffic between the ENB 30 and a plurality of UEs. In these cases, a quantity above the resource availability threshold can trigger release of the uplink resource 60 and a quantity below the resource availability threshold can trigger the retention of the uplink resource 60 by the UE 10.

Figure 3:
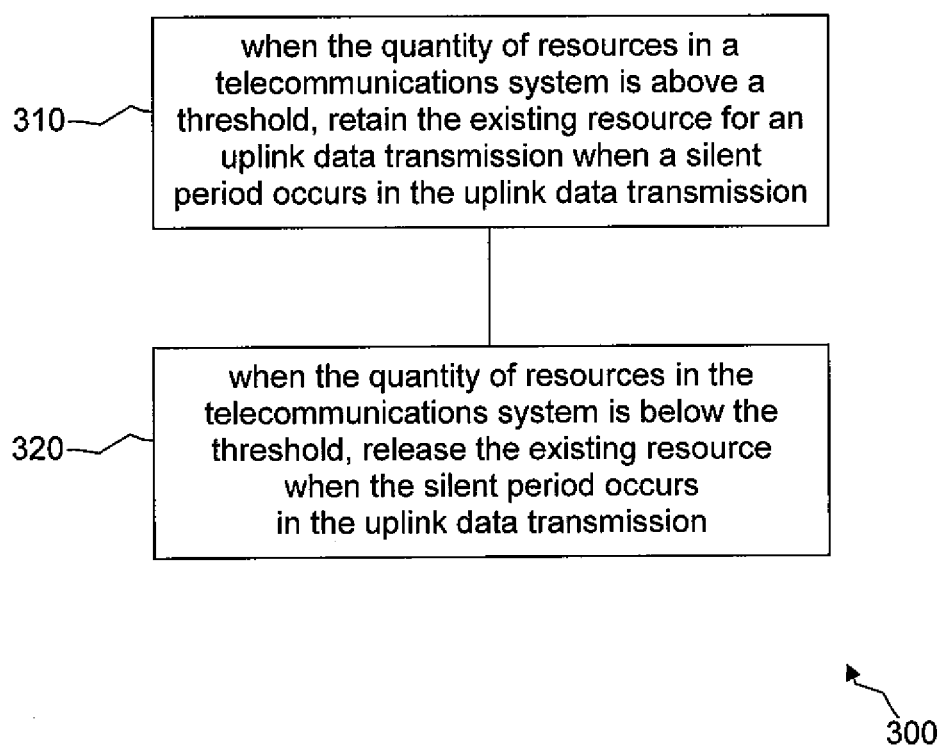
FIG. 3 is a diagram of a method for managing a resource for the uplink portion of a voice over Internet Protocol call according to an embodiment of the disclosure.

FIG. 3 illustrates an embodiment of a method 300 for managing a resource for a VoIP call. At block 310, when the quantity of available resources in a telecommunications system is above a threshold at a time when a silent period occurs in an uplink data transmission 40, the existing resource for the uplink data transmission 40 is retained. At block 320, when the quantity of available resources in the telecommunications system is below the threshold at a time when a silent period occurs in an uplink data transmission 40, the uplink resource 60 for the uplink data transmission is released.

The above discussion dealt with the release or retention of the uplink resource 60 when the UE 10 enters a silent period. The situation at the end of a silent period, when the UE 10 has released the uplink resource 60, is ready to resume sending voice-based data packets, and needs to re-establish an uplink resource 60, will now be considered. It should be understood that similar considerations may apply to the situation where an uplink resource is first established as well as applying to the re-establishment of an uplink resource after a silent period.

Referring again to FIG. 1, traditionally, a four-step process is followed in assigning a resource to the UE 10 so that the UE 10 may resume a VoIP call or some other type of data transmission to the ENB 30 after a silent period. In the first step, the UE 10 sends a single data bit to the ENB 30 over a scheduling request channel. The scheduling request channel is a dedicated channel between the UE 10 and the ENB 30 that is traditionally established specifically for the purpose of providing the UE 10 a channel for requesting resources from the ENB 30. When the UE 10 places a bit on the scheduling request channel, the ENB 30 interprets this as a request for a resource.

In the second step of the traditional resource assignment process, upon receiving the bit from the UE 10, the ENB 30 assigns the UE 10 only a small amount of resource capacity. In the third step, the UE 10 uses this limited resource capacity to send the ENB 30 a buffer status report that informs the ENB 30 of the quantity of data the UE 10 wishes to send. The ENB 30 uses this information to determine the quantity of resource capacity the UE 10 will need. In the fourth step, the ENB 30 assigns the UE 10 the amount of resource capacity appropriate for the data quantity specified in the buffer status report. It should be noted that, in some cases in the traditional resource assignment process, the UE 10 may not send a buffer status report to the ENB 30. For example, if load conditions are light, the load situation may be broadcast over the broadcast control channel (BCCH) or through a dedicated configuration.

The present disclosure provides, in an embodiment, for simplification of this four-step process for VoIP calls. More specifically, when the ENB 30 is aware that a resource request is related to a VoIP call, the second step, where the ENB 30 grants a small amount of resource capacity to the UE 10, and the third step, where the UE 10 uses this resource capacity to send a buffer status report to the ENB 30, can be eliminated. Instead, a two-step procedure may be followed. In a first step, the UE 10 sends a resource request to the ENB 30 in a manner that indicates to the ENB 30 that the resource request is related to a VoIP call. In a second step, upon receiving such a resource request, the ENB 30 assigns an appropriate level of resource capacity to the UE 10.

The amount of resource capacity assigned may be based on previous resources established between the UE 10 and the ENB 30 or may be determined in other manners. The assigned resource may be the same resource that existed between the UE 10 and the ENB 30 prior to the silent period or may be a different resource. The modulation, coding and other parameters related to the newly assigned resource may be the same as those of the previously assigned resource or may be different.

In an embodiment, the ENB 30 may be informed that a resource request is related to a VoIP using various techniques, three of which are described below. In a first technique, a second scheduling request channel may be established between the UE 10 and the ENB 30 in addition to the scheduling request channel that is traditionally established. When the UE 10 wishes to request a resource for a VoIP call, the UE 10 may place a data bit or other symbol on this VoIP-dedicated scheduling request channel. When the ENB 30 detects a bit on the VoIP-dedicated scheduling request channel, the ENB 30 knows that the resource request pertains to a VoIP call. The two-step resource assignment procedure described herein may then be followed.

Under this technique, the traditional scheduling request channel may still be established and may be used for resource requests that are not related to VoIP calls. For example, the UE 10 may have capabilities for both web browsing and VoIP calls, the traditional scheduling request channel may be used for resource requests related to the web browsing function and the VoIP-dedicated scheduling request channel may be used for VoIP-related resource requests.

In a second technique for informing the ENB 30 that a resource request is related to a VoIP call, modifications may be made at the physical layer to the traditional scheduling request channel such that the symbol delivered over the scheduling request channel may have one of three states. In a first state, the bit placed on the scheduling request channel has a first value; in a second state, the bit placed on the scheduling request channel has a second value; and in a third state, no bit is placed on the scheduling request channel. The first state might correspond to a semi-persistent request such as the two-step resource request procedure described herein. The second state may correspond to a dynamic request such as the four-step resource request procedure described herein. The third state might correspond to a condition where no resource request is made.

These states and their corresponding conditions are summarized in the following table. In this example, the symbol delivered over the scheduling request channel may have the states "−1", "+1", or "DTX", where "−1" represents a semi-persistent request, "+1" represents a dynamic request, and "DTX" represents no request. In other embodiments, the states may be represented in different ways and the request conditions may be assigned to the states in different ways.

| | |
|---|---|
| −1 | Semi-persistent request |
| +1 | Dynamic request |
| DTX | No request |

In a third technique for informing the ENB 30 that a resource request is related to a VoIP call, modifications may be made at the physical layer to the traditional scheduling request channel. In this case, quadrature phase shift keying (QPSK) may be used to allow two bits to be delivered over the scheduling request channel. The use of two bits allows one of four states to be placed on the scheduling request channel. The additional state, may be reserved for future use. One possible use for the additional state may be a SID request.

An example of these states and their corresponding conditions is given in the following table, where the states are represented by the values "11", "00", "10", and "01". In this example, "11" corresponds to a semi-persistent request, "00" corresponds to a dynamic request, "10" corresponds to no request, and "01" is reserved for future use. In other embodiments, the request conditions may be assigned to the states in different ways.

| | |
|---|---|
| 11 | Semi-persistent request |
| 00 | Dynamic request |
| 10 | No request |
| 01 | Reserved |

Figure 4:
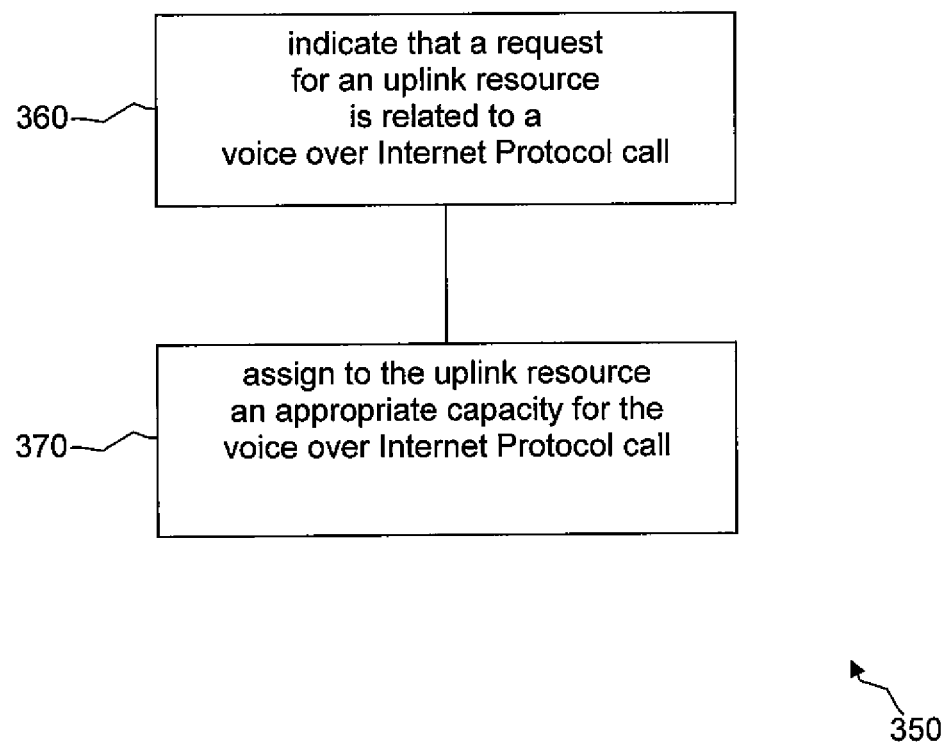
FIG. 4 is a diagram of a method for establishing an uplink resource for a voice over Internet Protocol call according to an embodiment of the disclosure.

FIG. 4 illustrates an embodiment of a method 350 for establishing an uplink resource 60 for a VoIP call. At block 360, an indication is given that a request for an uplink resource is related to a VoIP call. At block 370, an appropriate capacity for the VoIP call is assigned to the uplink resource.

Figure 5:
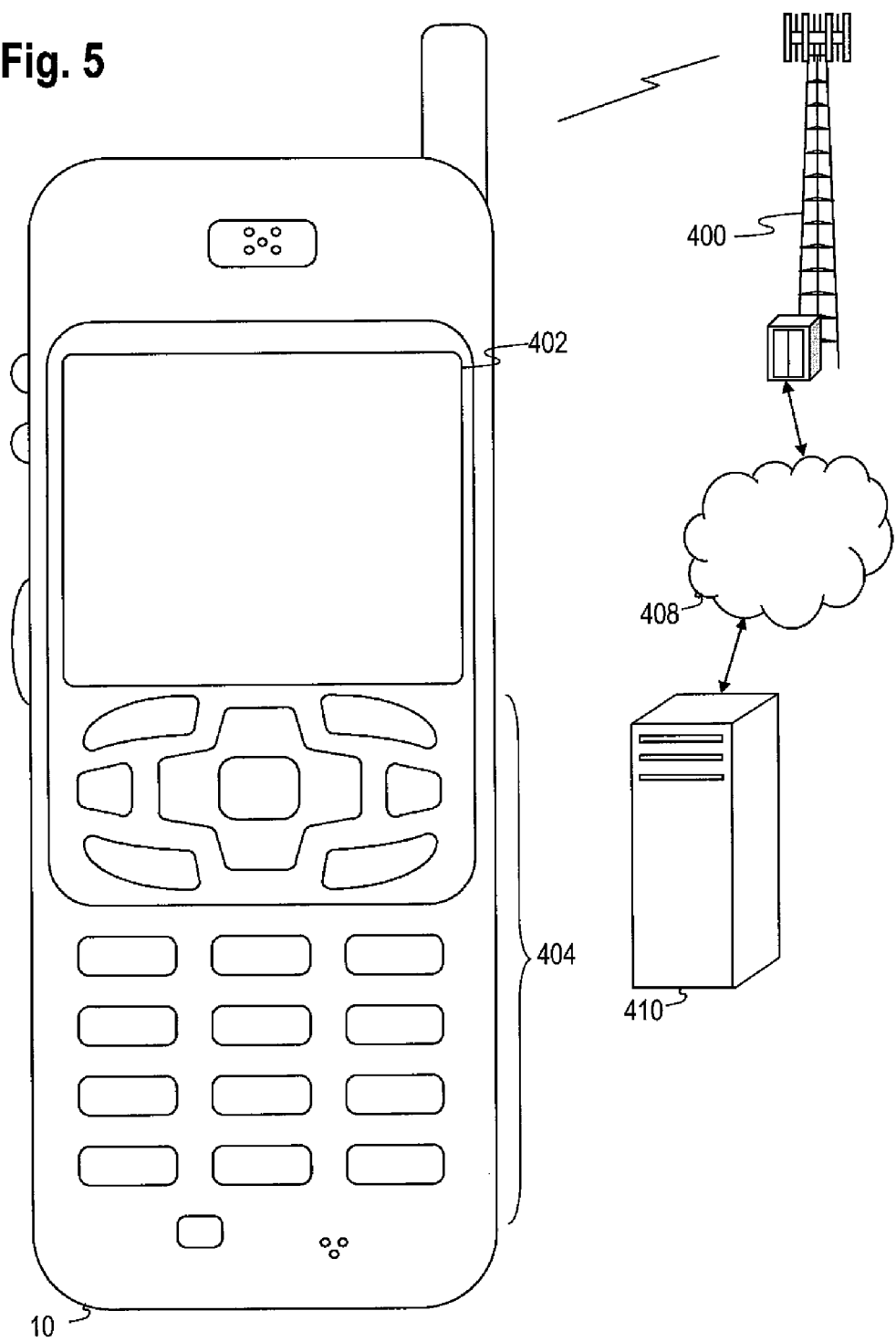
FIG. 5 is a diagram of a wireless communications system including a user equipment operable for some of the various embodiments of the disclosure.

FIG. 5 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 6:
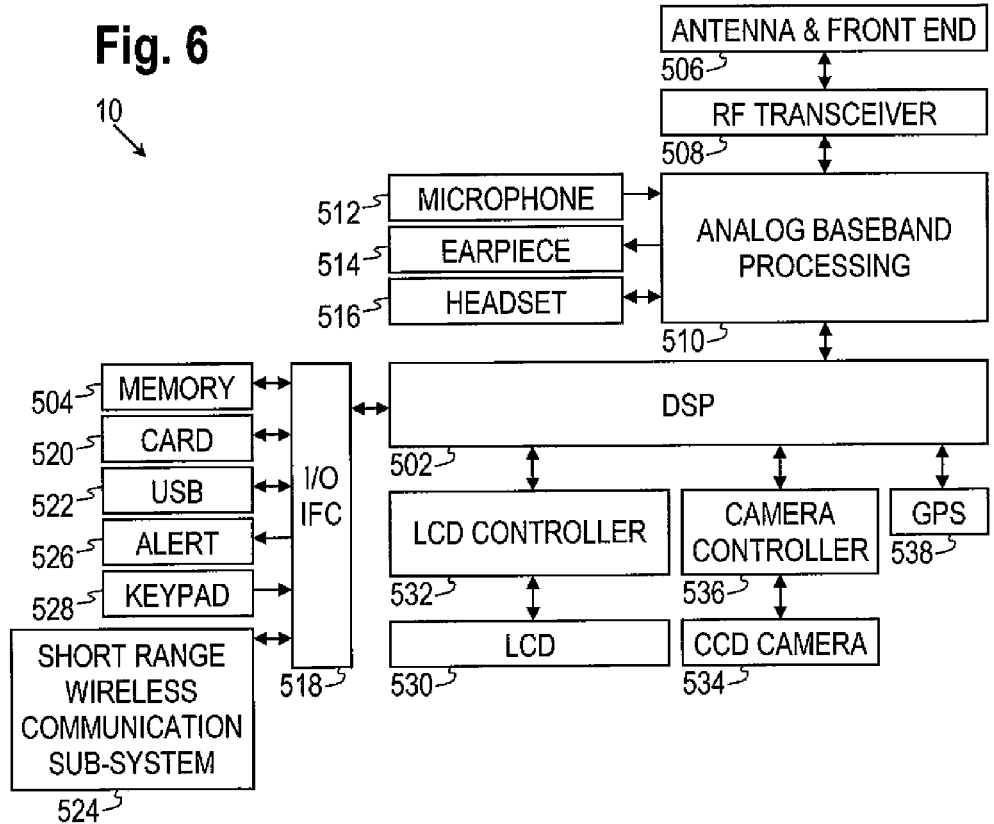
FIG. 6 is a block diagram of a user equipment operable for some of the various embodiments of the disclosure.

FIG. 6 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 7:
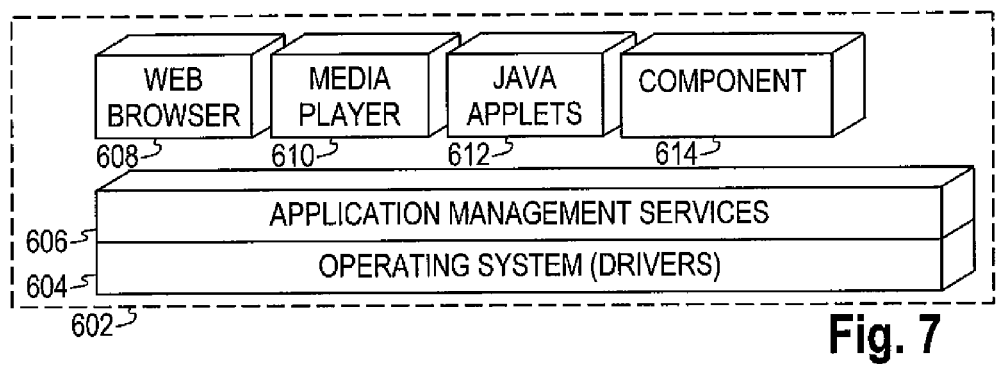
FIG. 7 is a diagram of a software environment that may be implemented on a user equipment operable for some of the various embodiments of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the resource management.

Figure 8:
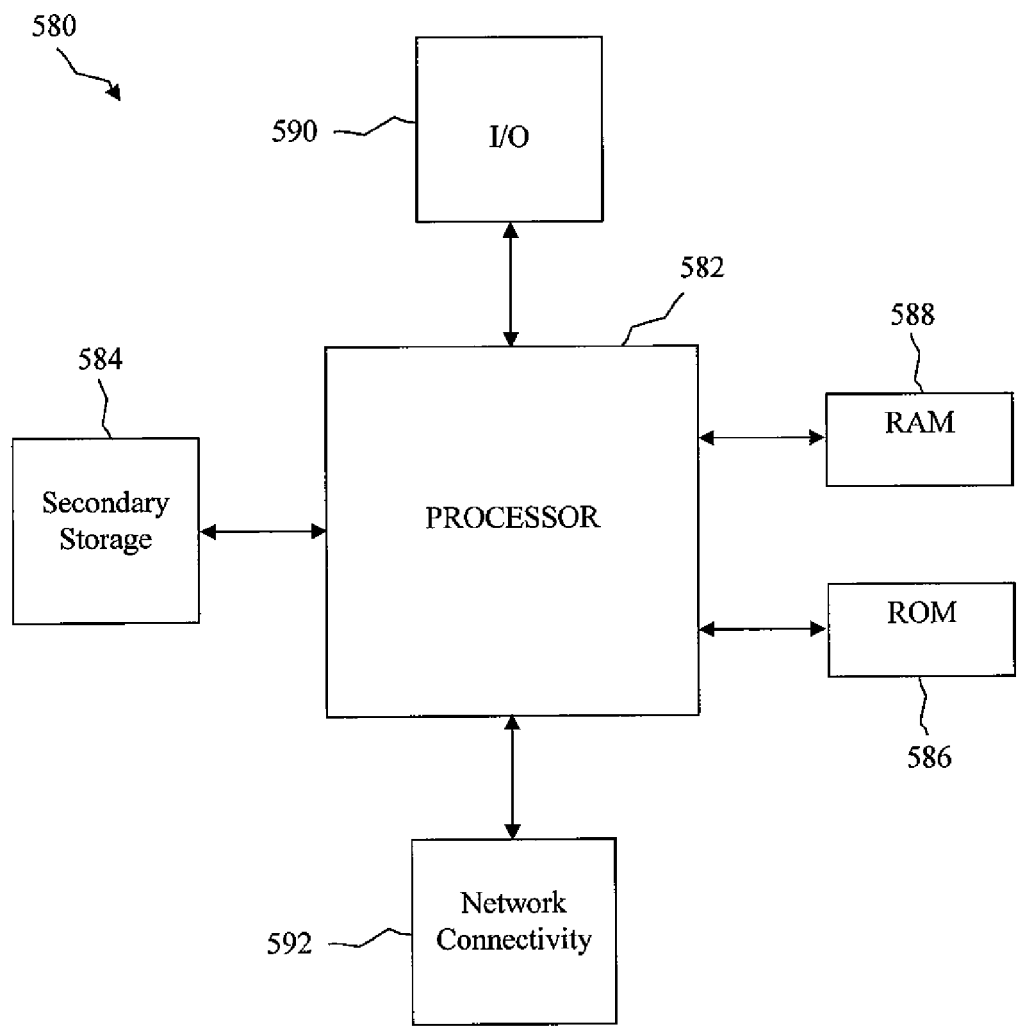
FIG. 8 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave. The network connectivity devices 592 may also include one or more transmitter and receivers for wirelessly or otherwise transmitting and receiving signal as are well know to one of ordinary skill in the art.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
   transmitting data to a first user equipment using a downlink resource, wherein the downlink resource is semi-persistently scheduled;
   transmitting, near the beginning of a silent period, a first release message to the first user equipment prior to transmitting a silence insertion descriptor to the user equipment, wherein the first release message is a physical layer signaling;
   assigning the downlink resource to a second user equipment, wherein the downlink resource is semi-persistently scheduled; and
   transmitting data to the second user equipment using the downlink resource.

2. The method of claim 1, wherein the first release message instructs the first user equipment to stop receiving data on the downlink resource.

3. The method of claim 1, wherein the data is voice over internet protocol data.

4. The method of claim 1, wherein the first release message causes the first user equipment to discontinue transmitting error messages corresponding to data reception on the semi-persistently scheduled resource.

5. The method of claim 1, wherein the release message is not a media access control (MAC) control protocol data unit (PDU).

6. The method of claim 1, further comprising receiving data from the first user equipment using an uplink resource, wherein the uplink resource is semi-persistently scheduled.

7. The method of claim 6, further comprising receiving a buffer status report from the first user equipment, and transmitting a second release message to the first user equipment based on the buffer status report, wherein the second release message is a physical layer signaling.

8. The method of claim 1, wherein the data is transmitted from an evolved Node B (eNB).

9. A network access device comprising:
   a transceiver configured to transmit data to a first user equipment using a downlink resource, wherein the downlink resource is semi-persistently scheduled, the transceiver configured to transmit, near the beginning of a silent period, a first release message to the first user equipment prior to transmitting a silence insertion descriptor to the user equipment, wherein the first release message is a physical layer signaling, a scheduling component configured to assign the downlink resource to a second user equipment, wherein the downlink resource is semi-persistently scheduled, and the transceiver configured to transmit data to the second user equipment using the downlink resource.

10. The network access device of claim 9, wherein the first release message instructs the first user equipment to stop receiving data on the downlink resource.

11. The network access device of claim 9, wherein the data is voice over internet protocol data.

12. The network access device of claim 9, wherein the first release message causes the first user equipment to discontinue transmitting error messages corresponding to data reception on the semi-persistently scheduled resource.

13. The network access device of claim 9, wherein the release message is not a media access control (MAC) control protocol data unit (PDU).

14. The network access device of claim 9, further configured to receive data from the first user equipment using an uplink resource, wherein the uplink resource is semi-persistently scheduled.

15. The network access device of claim 14, further configured to: receive a buffer status report from the first user equipment, and send a second release message to the first user equipment based on the buffer status report, wherein the second release message is a physical layer signaling.

16. The network access device of claim 9, wherein the network access device is a long term evolution network access device.

17. The network access device of claim 9, wherein the network access device is an evolved Node B (eNB).

* * * * *